United States Patent
Suwa et al.

(10) Patent No.: US 6,309,747 B1
(45) Date of Patent: Oct. 30, 2001

(54) LIQUID CURABLE RESIN COMPOSITION FOR OPTICAL FIBERS

(75) Inventors: Mitsuhito Suwa, Yokkaichi; Zen Komiya, Tsukuba; Yuji Takasugi, Kawasaki; Takashi Ukachi, Ushiku, all of (JP)

(73) Assignees: DSM N.V., Heerlen (NL); Japan Synthetic Rubber Co., LTD, Tokyo (JP)

( * ) Notice: Subject to any disclaimer, the term of this patent is extended or adjusted under 35 U.S.C. 154(b) by 0 days.

(21) Appl. No.: 09/149,003

(22) Filed: Sep. 8, 1998

Related U.S. Application Data

(63) Continuation of application No. 08/701,428, filed on Aug. 22, 1996, now Pat. No. 5,804,311, and a continuation of application No. PCT/NL95/00072, filed on Feb. 24, 1995.

(30) Foreign Application Priority Data

Feb. 24, 1994 (JP) .......................................... 6-26590

(51) Int. Cl.$^7$ ................ G02B 6/00; G02B 6/16; G02B 6/44; C08F 2/50; C08L 33/04

(52) U.S. Cl. ................ 428/378; 522/75; 522/81; 522/95; 522/117; 522/129; 522/153; 385/144; 385/123; 385/145

(58) Field of Search .................. 522/64, 95, 96, 522/129, 117, 120, 121, 122, 114, 150, 151, 153; 428/378; 385/114, 123, 145

(56) References Cited

U.S. PATENT DOCUMENTS

| | | | | |
|---|---|---|---|---|
| 4,355,053 | * | 10/1982 | Nezu et al. ............................ | 522/95 |
| 5,229,433 | * | 7/1993 | Schunck et al. ....................... | 522/96 |

\* cited by examiner

*Primary Examiner*—Susan W. Berman
(74) *Attorney, Agent, or Firm*—Pillsbury Madison & Sutro Intellectual Property Group

(57) ABSTRACT

A liquid curable resin composition for optical fibers comprising a polymer (a) having a number average molecular weight of 5,000 or more and containing at least two types of recurring ethylenic units, of which one type has a substituent group containing an ethylenically unsaturated group and the second type is substituted by a group —COOR$^3$ (wherein R$^3$ is a hydrogen atom or a hydrocarbon group having 1–30 carbon atoms), an aryl group, a cyano group, an alkyl group having 1–10 carbon atoms or by one or more halogen atoms.

43 Claims, No Drawings

LIQUID CURABLE RESIN COMPOSITION FOR OPTICAL FIBERS

This is a continuation of application Ser. No. 08/701,428, filed Aug. 22, 1996, now U.S. Pat. No. 5,804,311, and a continuation of application PCT/NL95/00072, filed Feb. 24, 1995.

BACKGROUND OF THE INVENTION

1. Field of the Invention

The present invention relates to a resin composition for coating optical fiber, and, more particularly, to a resin composition for coating optical fiber which, after curing, exhibits stable mechanical characteristics at high temperatures and no changes in color, and maintains durability for a long period of time.

2. Description of the Prior Art

Glass fiber used for optical fiber is very fragile and easily damaged. Therefore, coating the fiber with a resin which is curable by ultraviolet (UV) radiation is provided for protection and reinforcement.

Variations over time in mechanical characteristics, such as the Young's modulus and changes in the color of the UV curable resins must be small from the aspect of long-term reliability. This requires the content of noncurable components in the UV curable resin films to be as small as possible.

In order to improve the productivity of optical fiber manufacturing, the drawing speed of melted glass fiber material must be high. The high drawing speed, however, reduces the amount of radiation by UV light during the UV curable resin covering step, thereby leaving a greater amount of uncured components in the UV cured resin.

Therefore, along with the development of resins which satisfy various requirements in a variety of applications of these resins, the studies are ongoing for increasing the curing rate and curing degree. In addition, with regard to the reliability of the resins over a long period of time, various attempts for designing resin compositions having satisfactory properties such as heat resistance and weather resistance for preserving good outward appearance have been undertaken, including the investigations concerning the use of additives. No resin compositions have been developed, however, which are completely satisfactory.

Because UV curable urethane acrylate resins can satisfy a wide variety of requirements, they have been generally used for coating optical fiber. When used as a primary coating material, these UV curable urethane acrylate resins provide a film which contains only a very small amount of uncured components and which exhibits superb stability with little changes in the properties, while maintaining very soft properties. When used as a secondary coating material, they provide a film exhibiting tough properties and relatively hard. When they are used as matrix material, e.g. in ribbon structures, in addition to the characteristics required for the secondary coating material, they satisfy the requirements for good surface properties.

However, coating materials are desired which enable optical fibers to be usable under various conditions, occasionally, under very stringent conditions which have not been experienced by conventional optical fibers.

An object of the present invention is therefore to provide a liquid curable resin composition for optical fibers, which, while maintaining the superior properties and the high productivity of conventional urethane acrylate resins, exhibit excellent durability after curing.

In view of this situation, the present inventors have undertaken extensive studies and found that a resin composition containing a polymer having a specific type (meth) acryl group can produce a film which stably exhibits high mechanical properties at a high temperature with no change in color. The present inventors have found this resin composition to be useful for optical fiber coating.

SUMMARY OF THE INVENTION

Accordingly, the present invention provides a liquid curable resin composition for optical fibers comprising a polymer having a number average molecular weight of 5,000 or more and containing at least two types of recurring ethylenic units, of which one type has a substituent group containing an ethylenically unsaturated group and the second type is substituted by a group —COOR$^3$ (wherein R$^3$ is a hydrogen atom or a hydrocarbon group having 1–30 carbon atoms), an aryl group, a cyano group, an alkyl group having 1–10 carbon atoms or by one or more halogen atoms.

Preferably the ethylenically unsaturated group is a (meth) acryloyloxy group.

Preferably the polymer units are represented by the following formulas (1) and (2),

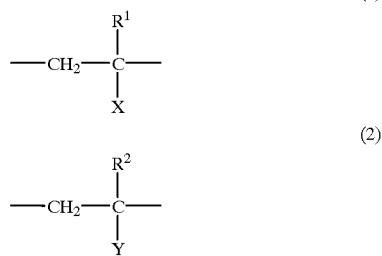

wherein R$^1$ and R$^2$ individually represent a hydrogen atom or a methyl group, X represents a group —COOR$^3$ (wherein R$^3$ is a hydrogen atom or a hydrocarbon group having 1–30 carbon atoms), an aryl group, a cyano group, a halogen atom, or an alkyl group having 1–10 carbon atoms, and Y represents a functional group containing a (meth) acryloyloxy group.

DETAILED DESCRIPTION OF THE INVENTION AND PREFERRED EMBODIMENTS

Examples of the hydrocarbon group R$^3$ having 1–30 carbon atoms in the above formulas are linear, branched, or cyclic alkyl, alkenyl, aralkyl, aromatic, or polycyclic hydrocarbons. Among these, linear, branched, or cyclic alkyl or alkenyl groups having 1–10 carbon atoms are preferred. Examples of preferred aryl groups are phenyl, halogenophenyl, methylphenyl, methoxyphenyl, and tri-alkylsilylphenyl. Of these, phenyl and methylphenyl are especially preferred. In case X is a halogen atom, examples of suitable halogen atoms are chlorine, fluorine, and bromine. When X is an alkyl group having 1–10 carbon atoms the alkylgroup can be linear, branched, or cyclic. Specific examples are methyl, ethyl, propyl, isopropyl, butyl, amyl, isobutyl, t-butyl, pentyl, isoamyl, hexyl, heptyl, octyl, isooctyl, 2-ethylhexyl, nonyl, decyl, isodecyl, and cyclohexyl.

The functional group Y containing a (meth)acryloyloxy group is preferably a group represented by the formula —A—B—OCOCR$^4$=CH$_2$, wherein A is —COO—, a phenyl group, or an alkylene group having 1–6 carbon atoms; B an alkylene group having 1–6 carbon atoms which may contain a hydroxy group; and $R^4$ represents a hydrogen atom or a methyl group.

In copolymer (a) the recurring unit (1) can consist of one group according to formula (1) or it may comprise two or more different types of units according to formula (1).

Component (a) can be prepared, for example, by copolymerizing a compound polymerizable by vinyl polymerization and a compound having a functional group which can later be used to introduce a (meth)acryloyloxy group and which is polymerizable by vinyl polymerization, and then introducing an acryl copolymer to the terminals or branches, preferably to the terminals, of the resulting copolymer.

The number average molecular weight of component (a) is 5,000 or more, preferably 5,000–50,000, and more preferably 10,000–40,000. If this number average molecular weight is smaller than 5,000, the viscosity of the resulting photo-curable resin composition is low so that coatability to optical fibers is impaired. If the molecular weight is greater than 50,000, the viscosity of the resulting photo-curable resin composition is too high so that coatability to optical fibers is also impaired.

Examples of the compounds polymerizable by vinyl polymerization are (meth)acrylate compounds, styrene compounds, acrylonitrile, and halogenated vinyl compounds.

Specific examples of (meth)acrylate compounds are methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, octadecyl (meth)acrylate, stearyl (meth)acrylate, benzyl (meth)acrylate, cyclohexyl (meth)acrylate, phenyl (meth)acrylate, dicyclopentanyl (meth)acrylate, dicyclopentenyl (meth)acrylate, tricyclodecanyl (meth)acrylate, isobornyl (meth)acrylate, and bornyl (meth)acrylate. Among these, preferred are methyl (meth)acrylate, ethyl (meth)acrylate, butyl (meth)acrylate, 2-ethylhexyl (meth)acrylate, isobornyl (meth)acrylate, and dicyclopentenyl (meth)acrylate.

As the styrene compounds, given are styrene, α-methylstyrene, p-bromostyrene, p-chlorostyrene, p-methoxystyrene, p-methylstyrene, and p-trialkylsilyl-styrene, with styrene and α-methylstyrene being particularly preferred. The halogenated vinyl compounds include vinyl chloride, 1,1-dichloroethylene, 1,2-dichloroethylene, vinyl bromide, fluoroethylene, 1,1-difluoroethylene, 1,2-difluoroethylene, trifluoroethylene, and tetrafluoroethylene. Of these, vinyl chloride, 1,1-dichloroethylene, and fluoroethylenes are particularly preferred.

Included in the compounds having a functional group which may be used to introduce the ethylenically unsaturated group, preferably a (meth)acryloyloxy group are (meth)acrylate compounds having a hydroxy group, (meth)acrylate compounds having an epoxy group, allyl compounds having an epoxy or hydroxy group, and styrene derivatives having a hydroxy group on the benzene ring. Specific examples are 2-hydroxyethyl (meth)acrylate, 2-hydroxy-propyl (meth)acrylate, 2-hydroxybutyl (meth)acrylate, glycidyl (meth)acrylate, allyl glycidyl ether, and p-hydroxystyrene.

There are no specific limitations to the method by which these vinyl compounds are polymerized. Any methods among the cationic polymerization method, the anionic polymerization method, and the polymerization using a Ziegler-Natta catalyst may be employed. The use of the emulsion polymerization method is also possible. A solvent may be used in the polymerization, but is not necessary.

In order to introduce the ethylenically unsaturated group, the polymer thus obtained is reacted with (meth)acrylic acid, maleic acid or fumaric acid. Preferably the polymer is reacted with (meth)acrylic acid.

A suitable solvent can be used in this reaction. A suitable catalyst, for example amino compounds or ammonium chloride compounds, may also be used in this reaction. The amount of (meth)acryl groups introduced is in the range of 1–50 mol %, particularly preferably 2–30 mol %, of the constituent ethylenic units. Commercially available reactive polymers are, e.g., B-3000, B-3001, B-3002, B-3003, B-3004, B-3005, B-3006, and AP-2150, all manufactured by Sin-Nakamura Chemical Industries in Japan.

Component (a) thus obtained is preferably incorporated in the resin composition of the present invention in an amount of 1–90% by weight, more preferably 20–80% by weight. If the amount is smaller than 1% by weight, the effects of the present invention cannot be sufficiently exhibited. Adding more than 90% by weight is possible but does not add any beneficial effect to the composition.

A further addition of a urethane (meth)acrylate oligomer (b) to the composition can have beneficial effects. In particular, when the curable resin composition of the present invention is used as a material for the primary coating of optical fibers, for which a low Young's modulus of elasticity is required for the cured material, the addition of such a component (b) is effective. Component (b) can, e.g. be obtained by reacting a polyol or polyamine compound, polyisocyanate compound, and a (meth)acrylate compound having a hydroxy group.

Examples of the polyol compounds are polyethylene glycol, polypropylene glycol, polytetramethylene glycol, polyhexamethylene glycol, polyheptamethylene glycol, polydecamethylene glycol, and polyetherdiols obtained by ring-opening copolymerization of two or more types of ionic-polymerizable cyclic compounds. Examples of ionic-polymerizable cyclic compounds include cyclic ethers such as ethylene oxide, propylene oxide, butene-1-oxide, isobutene oxide, 3,3-bischloro-methyloxetane, tetrahydrofuran, dioxane, trioxane, tetraoxane, cyclohexene oxide, styrene oxide, epichlorhydrine, glycidyl methacrylate, glycidyl acrylate, allylglycidyl ether, allylglycidyl carbonate, butadiene monoxide, isoprene monoxide, vinyl oxetane, vinyltetrahydrofuran, vinylcyclohexene oxide, phenylglycidyl ether, butylglycidyl ether, and glycidylbenzoate. It is also possible to use a polyetherdiol obtained by the ring-opening copolymerization of the above-mentioned ionic polymerizable compounds and cyclic imines such as ethylene imine and the like; cyclic lactones such as β-propiolactone, glycolic acid lactide, and the like; or cyclic siloxanes such as dimethylcyclopolysiloxane. Specific examples of combinations of two or more types of ionic-polymerizable cyclic compounds which can be given include tetrahydrofuran and propylene oxide; tetrahydrofuran and 2-methyltetrahydrofuran; tetrahydrofuran and 3-methyltetrahydrofuran; tetrahydrofuran and ethylene oxide; propylene oxide and ethylene oxide; and butene oxide and ethylene oxide. Either random or block bonded ring-opening copolymers of these ionic-polymerizable cyclic compounds may be used.

The polyether diols mentioned above may be available as commercial products, such as PTMG1000 and PTMG2000

(Mitsubishi Chemical Industries, Ltd.); PPG1000, EXCENOL 2020, EXCENOL 1020 (Asahi Oline); PEG1000, UNISAFE DC1100, UNISAFE DC1800 (Nippon Oil and Fats Co., Ltd.); PPTG2000, PPTG1000, PTG400, PTGL2000, (Hodogaya Chemical Co., Ltd.); and Z-3001-4, Z-3001-5, PBG2000A, PBG2000B (Dai-ichi Kogyo Seiyaku).

Beside these polyether diols, polyester diols, polycarbonate diols, and polycaprolactone diols are given as examples of polyol compounds. These diols may be used in combination with polyether diols. There are no specific limitations to the method of polymerization of these structural units. They may e.g. be polymerized by random, block, or graft polymerization.

Examples of polyols which can be used include polyester diols obtained from the reaction of a polyhydric alcohol, such as ethylene glycol, polyethylene glycol, propylene glycol, polypropylene glycol, tetramethylene glycol, polytetramethylene glycol, 1,6-hexane diol, neopentyl glycol, 1,4-cyclohexanedimethanol, 3-methyl-1,5-pentane diol, 1,9-nonane diol, or 2-methyl-1,8-octanediol, and a polybasic acid, such as phthalic acid, isophthalic acid, terephthalic acid, maleic acid, fumaric acid, adipic acid, or sebacic acid. Commercially available products which can be given include Kurapole P-2010, PMIPA, PKA-A, PKA-A2, and PNA-2000, all manufactured by Kuraray Co., Ltd.

As polycarbonate diols, 1,6-hexane polycarbonate, and commercially available products, such as DN-980, DN-981, DN-982, DN-983 (Nihon Polyurethane), and PC-8000 (PPG of the US) can be given as examples.

Further examples of polycaprolactone diols are those obtained by the reaction of ε-caprolactone and a diol, such as ethylene glycol, polyethylene glycol, propylene glycol, polypropylene glycol, tetramethylene glycol, polytetramethylene glycol, 1,2-polybutylene glycol, 1,6-hexane diol, neopentyl glycol, 1,4-cyclo-hexanedimethanol, or 1,4-butane diol. These diols are commercially available as PLACSEL 205, 205AL, 212, 212AL, 220, and 220AL, all manufactured by Daicell Co., Ltd.

A number of other diols, beside the above-described diols, can be used. These include ethylene glycol, propylene glycol, 1,4-butane diol, 1,5-pentane diol, 1,6-hexane diol, neopentyl glycol, 1,4-cyclohexanedimethanol, ethylene oxide addition compound to bisphenol A, butylene oxide addition compound to bisphenol A, ethylene oxide addition compound to bisphenol F, butylene oxide addition compound to bisphenol F, ethylene oxide addition compound to hydrogenated bisphenol A, butylene oxide addition compound to hydrogenated bisphenol A, ethylene oxide addition compound to hydrogenated bisphenol F, butylene oxide addition compound to hydrogenated bisphenol F, dimethylol compounds of dicyclopentadiene, tricyclodecanedimethanol, β-methyl-δ-valerolactone, polybutadiene with terminal hydroxy groups, hydrogenated polybutadiene with terminal hydroxy groups, castor oil-denatured polyol, polydimethylsiloxane with terminal diols, and polydimethylsiloxane carbitol-denatured polyols.

In addition to the above-described combined use of diols, diamines may be used. Examples of the diamines include ethylene diamine, tetramethylene diamine, hexamethylene diamine, paraphenylene diamine, 4,4'-diaminodiphenylmethane, diamines with hetero atoms, and polyether diamines. The number average molecular weight of these diamines is 50–15,000, preferably 100–8,000.

The polyisocyanate can e.g. be chosen from 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylene bis(4-cyclohexyl-isocyanate), 2,2,4-trimethylhexamethylene diisocyanate, 1,4-hexamethylene diisocyanate, bis(2-isocyanate-ethyl) fumarate, 6-isopropyl-1,3-phenyl diisocyanate, 4-diphenylpropane diisocyanate, and lysine diisocyanate. These polyisocyanates may be used either alone or in combination of two or more.

Examples of the (meth)acrylate compound with a hydroxy group are 2-hydroxyethyl (meth)acrylate, 2-hydroxypropyl (meth)acrylate, 2-hydroxybutyl (meth)acrylate, 2-hydroxy-3-phenyloxypropyl (meth)acrylate, 1,4-butanediol mono (meth)acrylate, 2-hydroxyalkyl(meth)acryloyl phosphate, 4-hydroxycyclohexyl (meth)acrylate, 1,6-hexanediol mono (meth)acrylate, neopentylglycol mono(meth)acrylate, trimethylolpropane di(meth)acrylate, trimethylolethane di(meth)acrylate, pentaerythritol tri(meth)acrylate, dipentaerythritol penta(meth)acrylate, (meth)acrylates represented by the following formula (3),

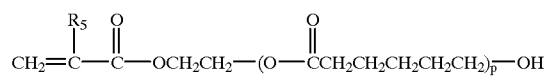

(3)

wherein $R_5$ is a hydrogen atom or a methyl group and p is an integer from 1–15, preferably 1–4. Compounds obtained by the addition polymerization of a glycidyl group-containing compound, such as alkyl glycidyl ether, allyl glycidyl ether, or glycidyl (meth)acrylate, and (meth)acrylic acid can also be given as examples. Among such compounds, 2-hydroxyethyl (meth)acrylate and 2-hydroxypropyl (meth)acrylate are especially preferred.

With an objective of increasing the adhesion of the composition to glass, in addition to the (meth)acrylate compounds having a hydroxy group, the following compounds may additionally be used in the production of component (b): γ-aminopropyltriethoxy silane, N-phenylaminopropyltrimethoxy silane, and γ-mercaptopropyltrialkoxy silane. Of these, γ-mercaptopropyltrimethoxy silane is especially preferred. Commercially available silane compounds are KBM-573, KBM-803, KBE-903 (Shin-etsu Silicone Co., Ltd.), A-189, 1100, 1120 (Nippon Uniker), and SH6020, SH6062, SZ6083 (Toray Dow-Corning Silicone). Urethane (meth)acrylate oligomers having trialkylsilyl group at the molecular terminals can be prepared by the addition of these compounds.

The number average molecular weight of the urethane (meth)acrylate oligomer (b) used in the present invention is preferably 350–20,000, particularly preferably 500–15,000. If this number average molecular weight is smaller than 350, the resulting composition after curing not only has reduced breaking elongation and tenacity, but also may be the cause of an increase in the transmission loss of optical fiber when the composition is used as the covering material for the optical fiber. If the number average molecular weight is greater than 20,000, the viscosity of the composition is too large for the composition to be handled with ease.

The synthesis of component (b) of the present invention can be achieved by reacting the above-described diol, polyisocyanate, and (meth)acrylate compound having a hydroxy group and, possible a functional silane.

Specifically, an isocyanate group of the polyisocyanate compound is reacted with the hydroxy groups of the diol compound and another isocyanate group is reacted with the (meth)acrylate compound having a the hydroxy group. This reaction can be carried out by a conventional method.

In this urethanization reaction, a urethanization catalyst, such as copper naphthenate, cobalt naphthenate, zinc naphthenate, di-n-butyl tin dilaurate, triethylamine, triethylenediamine, or 2-methyltriethylenediamine, can be used in an amount of 0.1–1 part by weight for 100 parts by weight of the total amount of the reaction components. The reaction temperature is preferably 10–90° C., and more preferably 30–80° C.

The urethane (meth)acrylate oligomer (b) thus obtained can be used in the composition of present invention in an amount of e.g. 0–80% by weight, and preferably 10–60% by weight. This will provide the composition with better coatability, the cured material with flexibility, and the resulting optical fiber products with long-term reliability.

In addition to the above-mentioned components (a) and (b), it is possible to add a polymerization diluent, as component (c), and a polymerization initiator, as component (d), both described in detail below, to the extent that the effects of the present invention are not adversely affected.

Component (c) used as the polymerization diluent is preferably a compound which has at least one ethylenically unsaturated group in the molecule and is liquid or solid at normal temperature. Typically, a (meth)acrylate compound or a compound having a vinyl group is preferably used. The (meth)acrylate compounds are grouped into monofunctional compounds and polyfunctional compounds. Either monofunctional or polyfunctional compounds can be used or both. Monofunctional compounds are used mainly when a cured material with a relatively low elasticity is desired. The modulus of elasticity can be controlled by using polyfunctional compounds in combination at a suitable ratio.

Examples of monofunctional compounds are 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, octadecyl (meth)acrylate, stearyl (meth)acrylate, tetrahydro-furfuryl (meth)acrylate, butoxyethyl (meth)acrylate, ethoxydiethylene glycol (meth) acrylate, benzyl (meth)acrylate, cyclohexyl (meth)acrylate, phenoxyethyl (meth)acrylate, polyethylene glycol mono (meth)acrylate, polypropylene glycol mono(meth)acrylate, methoxyethylene glycol (meth)acrylate, ethoxyethyl (meth) acrylate, methoxypolyethylene glycol (meth)acrylate, methoxypolypropylene glycol (meth)acrylate, dicyclopentadienyl (meth)acrylate, dicyclopentanyl (meth)acrylate, dicyclopentenyl (meth)acrylate, tricyclodecanyl (meth) acrylate, isobornyl (meth)acrylate, bornyl (meth)acrylate, diacetone (meth)acrylamide, isobutoxymethyl (meth) acrylamide, N-vinylpyrrolidone, N-vinylcaprolactam, N,N-dimethyl (meth)acrylamide, t-octyl (meth)acrylamide, dimethylaminoethyl (meth)acrylate, diethylaminoethyl (meth) acrylate, 7-amino-3,7-dimethyloctyl (meth)acrylate, N,N-diethyl (meth)acrylamide, N,N'-dimethylaminopropyl (meth)acrylamide, (meth)acryloyl morpholine; vinyl ethers such as hydroxybutyl vinyl ether, lauryl vinyl ether, cetyl vinyl ether, and 2-ethylhexyl vinyl ether; esters of maleic acid; esters of fumaric acid; and compounds represented by the following formulas (4) to (6).

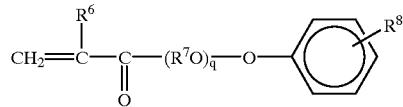

wherein $R^6$ is a hydrogen atom or a methyl group; $R^7$ is an alkylene group containing 2 to 6, preferably 2 to 4 carbon atoms; $R^8$ is a hydrogen atom or an alkyl group containing 1 to 12, preferably 1 to 9, carbon atoms; q is an integer from 0 to 12, preferably 1 to 8.

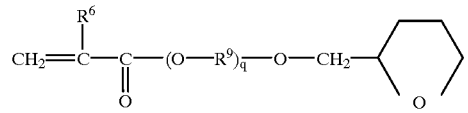

wherein $R^6$ is the same as above; $R^9$ is an alkylene group containing 2 to 8, preferably 2 to 5, carbon atoms; and q is an integer from 1 to 8, preferably 1 to 4.

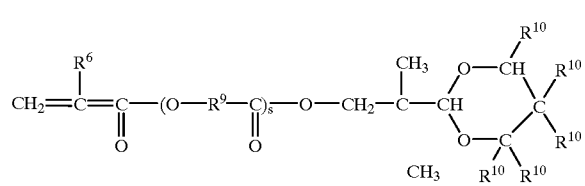

wherein $R^6$, $R^9$ are the same as above; $R^{10}$ is a hydrogen atom or a methyl group and s is 1 to 10.

Commercial products which can be given as examples of the monofunctional compounds include ARONIX M111, M113, M114, M117 (Toagosei Chemical Industry Co., Ltd.), KAYARAD TC110S, R629, R644 (Nippon Kayaku Co., Ltd.), BISCOAT 3700 (Osaka Organic Chemical Industry, Ltd.), and the like.

Examples of polyfunctional compounds include trimethylolpropane tri(meth)acrylate, pentaerythritol (meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth) acrylate, neopentyl glycol di(meth)acrylate, trimethylolpropanetrioxyethyl (meth)acrylate, tris(2-hydroxyethyl) isocyanurate tri(meth)acrylate, tris(2-hydroxyethyl) isocyanurate di(meth)acrylate, tricyclodecanedimethanol di(meth)acrylate, and epoxy (meth)acrylate which is an addition compound of (meth)acrylate to bisphenol A glycidyl ether. Commercial products which can be given as examples include YUPIMER-UV SA1002, SA2007 (Mitsubishi Petrochemical Co., Ltd.), BISCOAT 700 (Osaka Organic Chemical Industry Ltd.), KAYARAD R-604, DPCA-20, DPCA-30, DPCA-60, DPCA-120, HX-620, D-310, D-330, (Nippon Kayaku Co., Ltd.), ARONIX M210, M215, M315, M325 (Toagosei Chemical Industry Co., Ltd.), and the like.

The molecular weight of these (meth)acrylate compounds are usually about 200–3,000. Among the above (meth) acrylate compounds, especially preferred are commercially available products, such as ARONIX M111, M113, M114, M117 (Toagosei Chemical Industry Co., Ltd.), and KAYARAD TC110S, R629, R644 (Nippon Kayaku Co., Ltd.). The use of these (meth)acrylate compounds improves flexibility, especially flexibility at low temperatures, of the cured products. Further, a combined use of two or more of the (meth)acrylate compounds increases the curing rate of the resulting resin composition.

The reaction diluent (c) is preferably incorporated in the composition of the present invention in the range of 5 to 80% by weight, and more preferably in the range of 10 to 60% by weight.

The resin composition of the present invention can be cured by heat and/or radiation. Here, radiation means infrared light, electron beam, visible light, ultraviolet light, and ionic radiations such as X-rays, α-rays, β-rays, and γ-rays.

When the resin composition of the present invention is cured by heat, a radical polymerization initiator is usually used as component (d). Examples which can be given of the radical polymerization initiator include peroxides and azo compounds, such as benzoyl peroxide, t-butyloxybenzoate, and azobisisobutylonitrile.

When the composition of the present invention is cured by visible light and/or UV light, photo-polymerization initiator is used as component (d), optionally in combination with a photo-sensitizer.

Examples of the photo-polymerization initiator (d) are 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-on, 2-hydroxy-2-methyl-1-phenylpropane-1-on, thioxanthone, diethylthioxanthone, 2-isopropylthioxanthone, 2-chlorothioxanthone, 2-methyl-1-(4-(methylthio)phenyl)-2-morpholinopropane-1-on, and 2,4,6-trimethylbenzoyldiphenylphosphine oxide. Commercially available photo-polymerization initiators are IRGACURE 184, 651, 500, 907 (Ciba Geigy); Lucirine LR8728 (BASF); Darocure 1116, 1173 (Merck Co.); and Ubecryl P36 (UCB Co.). Examples of photo-sensitizers are triethylamine, diethylamine, N-methyldiethanolamine, ethanolamine, 4-dimethylaminobenzoic acid, methyl-4-dimethylaminobenzoate, ethyl 4-dimethylaminobenzoate, isoamyl 4-dimethylaminobenzoate, and commercially available products such as Ubecryl P102, P103, P104, and P105 manufactured by UCB Co.

The polymerization initiators are generally used in an amount of 0.1–10% by weight of the composition of the resent invention. If the amount is too small, sufficient curing cannot be achieved. The addition of polymerization initiators of the amount exceeding the above range, on the other hand, does not bring about increase in the curing rate proportionate to the excess amount. The amount in the above-described range is therefore efficient in practice.

Beside the above components, the composition of the present invention may further comprise other components, such as antioxidants, pigments or dyes, UV absorbers, photo-stabilizers, silane coupling agents, thermal polymerization inhibitors, leveling agents, surface active agents, preservatives, plasticizers, lubricants, solvents, fillers, stabilizers to prevent aging characteristics, leak preventives, and surface improvers. Antioxidants which can be used are Irganox 1010, 1035, 1076, 1222 (manufactured by Ciba Geigy), and the like. Suitable UV absorbers are Tinuvin P, 234, 320, 326, 327, 328, 213 (manufactured by Ciba Geigy), Sumisorb 110, 130, 140, 220, 250, 300, 320, 340, 350, 400 (manufactured by Sumitomo Chemical Industries Co., Ltd.), and the like. Photo-stabilizers which can be added include Tinuvin 292, 144, 622LD (manufactured by Ciba Geigy), and Sanol LS770, LS765, LS292, LS2626, LS1114, LS744 (manufactured by Sankyo Chemical Co.). Examples of silane coupling agents are γ-aminopropyltriethoxy silane, γ-mercaptopropyltrimethoxy silane, γ-methacryloxypropyltrimethoxysilane, and commercial products such as SH6062, SZ6030 (manufactured by Toray-Dow Corning Silicone Co.) and KBE903, KBM803 (manufactured by Sin-etsu Silicone Co.). Commercially available antioxidants include Antigene W, S, P, 3C, 6C, RD-G, FR, and AW (manufactured by Sumitomo Chemical Co.).

Further, in addition to the above components, polymers or oligomers can be added as additives. Such polymers or oligomers include epoxy resin, polyamide, polyimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine-containing oligomer, silicone oligomer, polysulfide oligomer, and the like.

The liquid curable resin composition of the present invention can be prepared by blending these components by a conventional method. The viscosity of the composition thus prepared is normally 100 to 20,000 cps at 25° C., and preferably 1,500 to 15,000 cps at 25° C.

The present invention will now be explained with reference to the following embodiments, which are in no way limitative of the scope of the invention.

In the examples below, "part(s)" denotes "part(s) by weight".

EXAMPLES

Preparation of component (a)

400 g toluene was charged into a reaction vessel equipped with a stirrer, a cooler, and a dropping funnel and heated at 100–110° C. A mixture of 368 g of 2-ethylhexyl acrylate, 20 g of methyl methacrylate, 85 g of glycidyl methacrylate, and 5 g of benzoyl peroxides was dropped into the toluene over a period of two hours. The mixture was further reacted for 6 hours after the addition. After this, 43 g of acrylic acid, 0.5 g of hydroquinone, and 10 g of triethylbenzylammonium chloride were added, and the esterification reaction was carried out for 8 hours at the same temperature. After the reaction, 6 g of water and 2 g of triethylamine were added to neutralize remaining acid.

Unreacted acrylic acid, water and toluene were removed by azeotropic distillation until the residual solvent content is reduced to 0.05%, thus obtaining component (a), which is herein called Polymer (A). The number molecular weight determined by gel permeation chromatography was about 25,000.

Preparation of urethane acrylate UA-1

Into a reaction vessel equipped with a stirrer were charged 3.0 parts of tolylene diisocyanate, 50.5 parts of a ring-opening copolymer from ethylene oxide and butene oxide, having a number average molecular weight of 4,000, and 0.01 part of 2,6-di-t-butyl-p-cresol, as a polymerization inhibitor. The mixture was cooled with ice to a temperature of below 10° C., while stirring. When the temperature was lower than 10° C., 0.04 part of dibutyltindilaurate was added and the mixture was stirred for 2 hours while controlling the temperature at 20–30° C. Then, after the addition of 0.3 part of γ-mercaptopropyltrimethoxy silane, the mixture was stirred for a further one hour at 30–40° C., whereupon 1.2 parts of hydroxyethyl acrylate was added. The mixture was stirred for 4 hours at 50–60° C., until the amount of remaining isocyanate is 0.1% by weight or less. The liquid urethane acrylate obtained in this manner is hereinafter referred to as UA-1.

Preparation of urethane acrylate UA-2

Into a reaction vessel equipped with a stirrer were charged 5.5 parts of tolylene diisocyanate, 42.0 parts of a ring-opening copolymer from tetrahydrofuran and 3-methyltetrahydrofuran, having a number average molecular weight of 2,000, and 0.01 part of 2,6-di-t-butyl-p-cresol, as a polymerization inhibitor. The mixture was cooled with ice to a temperature of below 10° C., while stirring. When the temperature was lower than 10° C., 0.04 part of dibutyltindilaurate was added and the mixture was stirred for 2 hours while controlling the temperature at 20–30° C. Then, after the addition of 2.2 parts of hydroxyethyl acrylate, the mixture was stirred for 4 hours at 50–60° C., until the amount of remaining isocyanate is 0.1% by weight or less. The Liquid urethane acrylate obtained in this manner is hereinafter referred to as UA-2.

Examples 1–4, Comparative Examples 1–2

Components shown in Table 1 were charged in a reaction vessel equipped with a stirrer and stirred for 3 hours, while maintaining the temperature at 50–60° C., to obtain liquid curable resin compositions.

In Table 1, M113 is Aronix M113 manufactured by Toagosei Chemical Industries Co., Ltd., corresponding to component (c); IBXA is isobornyl acrylate manufactured by Osaka Organic Chemical Industry, Ltd., corresponding to component (c); Vcap is N-vinylcaprolactam; and Lucirin is a photoinitiator manufactured by BASF.

TABLE 1

| Component | Example | | | | Comparative example | |
|---|---|---|---|---|---|---|
| | 1 | 2 | 3 | 4 | 1 | 2 |
| a) polymer A | 55 | 27.5 | 25 | 20 | — | — |
| b) UA-1 | — | 27.5 | — | 30 | 55 | — |
| b) UA-2 | — | — | 25 | — | — | 50 |
| c) M113 | 21.3 | 21.3 | 21.3 | 21.3 | 21.3 | 21.3 |
| c) IBXA | 15 | 15 | 20 | 20 | 15 | 20 |
| c) Vcap | 6 | 6 | 6 | 6 | 6 | 6 |
| d) Lucirin | 1.5 | 1.5 | 1.5 | 1.5 | 1.5 | 1.5 |

Test Example

Test specimens were prepared from liquid compositions prepared in Examples 1–4 and Comparative Examples 1–2 according to the method described below. The pulling characteristic, color change, and durability were evaluated on the test specimens according to the following methods. The results are shown in Table 2.

(1) Preparation of test specimens

Liquid compositions were coated over quartz plates using an applicator with a thickness of 250 μm. The samples were then subjected to radiation from ultraviolet light at 1.0 J/cm² in air, to obtain cured films with a thickness of 200 μm. The cured film was cut into pieces with a 0.6 cm width. These test pieces were used for the tests.

2) Measurement of pulling characteristic

The Young's modulus of the test pieces was measured according to JIS 7127, at 23° C. at a drawing rate of 1 mm/min and a bench mark of 25 mm using a tension tester. This measurement was carried out on the test pieces conditioned at 23° C. and 50% RH for longer than 12 hours.

(3) Measurement of color change

Extinction (E) and Yellowness-Index (YI) values of test pieces were measured to determine the degrees of color change using a color-difference meter, TC-1800M, manufactured by Tokyo Denshoku Co.

(4) Evaluation of Durability

Test specimens before cutting into 0.6 cm width were placed in a thermostat at 150° C. and were taken out therefrom from time to time to measure the pulling characteristic and the color changes. The durability evaluation was based on the ratio of these values and the initial value.

TABLE 2

| Evaluation items | Example | | | | Comparative Example | |
|---|---|---|---|---|---|---|
| | 1 | 2 | 3 | 4 | 1 | 2 |
| Young's Modulus Initial Value (Kg/mm²) | 0.33 | 0.16 | 0.14 | 0.12 | 0.06 | 0.10 |
| Young's Modulus after heating at 150° C. (% Initial Value) for: | | | | | | |
| 1 day | 96 | 88 | 87 | 84 | 49 | 45 |
| 3 days | 88 | 75 | 83 | 77 | 23 | 20 |
| 5 days | 82 | 76 | 84 | 75 | 20 | 20 |
| 10 days | 80 | 71 | 80 | 70 | 24 | 23 |
| 16 days | 79 | 72 | 77 | 67 | 35 | 20 |
| ΔE/YI Initial Value | 2/3 | 2/3 | 2/3 | 2/3 | 2/3 | 2/3 |
| ΔE/YI after heating at 150° C. for: | | | | | | |
| 1 day | 3/5 | 5/8 | 5/8 | 5/8 | 23/42 | 24/43 |
| 4 days | 4/7 | 8/14 | 9/14 | 12/18 | 37/71 | 38/73 |
| 10 days | 7/12 | 15/28 | 17/29 | 20/35 | 46/25 | 48/30 |

As can be seen in Table 2, the composition of the present invention which contains component (a) has higher stability and less susceptible to color change than the compositions which do not contain component (a). Thus, it is an excellent material for optical fiber coating.

As illustrated above, the liquid curable resin composition for optical fibers of the present invention produces a cured material having stabler mechanical characteristics at high temperatures and exhibiting smaller changes in the color as compared with conventional urethane acrylate compositions. Further, it is possible to suitably control the Young's modulus of elasticity and elongation of the composition by combining component (a) with a specific amount of urethane acrylate as described. Such a composition has also excellent curing characteristic. Because of this, the composition is particularly suitable for use as the material for optical fiber coating requiring excellent durability.

What is claimed is:

1. A liquid curable resin composition comprising:

(a) a polymer having a number average molecular weight of 5,000 or more and containing polymeric units represented by formulas (1) and (2),

(1)

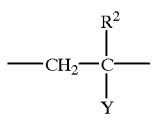

wherein R¹ and R² independently represent a hydrogen atom or a methyl group, X represents a —COOR³ group (wherein R³ is a hydrogen atom or a hydrocarbon group having 1–30 carbon atoms), an aryl group, a cyano group, a halogen atom or alkyl group having 1–10 carbon atoms and Y represents a functional group containing a (meth)acryloyloxy group; and (b) 10–80% by weight of the resin composition of a urethane (meth)acrylate oligomer having a number average molecular weight of 350 to 20,000, said oligomer being obtained by reacting
(i) a polyol or polyamine compound;
(ii) a polyisocyanate compound; and
(iii) a (meth)acrylate compound having a hydroxy group
(iv) optionally, a functional silane.

2. The composition of claim 1, wherein said composition comprises:
(a) 1–90% by weight of said polymer;
(b) 10–80% by weight of said urethane (meth)acrylate oligomer;
(c) 5–80% by weight of a reaction diluent; and
(d) 0.1–10% by weight of a photoinitiator.

3. The composition of claim 1, wherein said composition comprises:
(a) 20–80% by weight of said polymer
(b) 10–60% by weight of said urethane (meth)acrylate oligomer;
(c) 10–60% by weight of a reaction diluent; and
(d) 0.1–10% by weight of a photoinitiator.

4. The composition of claim 1, wherein the composition further comprises:
an epoxy resin.

5. The composition of claim 1, wherein the composition further comprises:
a silane coupling agent.

6. The composition of claim 1, wherein the composition further comprises:
at least one pigment or dye.

7. The composition of claim 6, wherein said composition is suitable as a secondary coating.

8. The composition of claim 1, wherein said composition has a viscosity of 100 to 20,000 cps at 25° C.

9. The composition of claim 1, wherein said composition has a viscosity of 1,500 to 15,000 cps at 25° C.

10. The composition of claim 1, wherein said composition is suitable as a primary coating.

11. The composition of claim 1, wherein said composition is suitable as a secondary coating.

12. The composition of claim 1, wherein said composition is suitable as a matrix material.

13. The composition of claim 1, wherein said composition, upon cure, has a Young's modulus of 0.33 Kg/mm² or less.

14. The composition of claim 9, wherein said composition, upon cure, has a Young's Modulus of 0.16 Kg/mm² or less.

15. The composition of claim 1, wherein said composition, upon cure, has a ΔE value after heating at 150° C. for 1 day of 5 or less.

16. The composition of claim 15, wherein said composition, upon cure, has a Yellow Index after heating at 150° C. for 1 day of 8 or less.

17. The composition of claim 1, wherein said composition, upon cure, has a ΔE value after heating at 150° C. for 4 days of 12 or less.

18. The composition of claim 17, wherein said composition, upon cure, has a Yellow Index after heating at 150° C. for 4 days of 18 or less.

19. The composition of claim 1, wherein said composition, upon cure, has a ΔE value after heating at 150° C. for 10 days of 20 or less.

20. The composition of claim 1, wherein said composition, upon cure, has a Yellow Index after heating at 150° C. for 1 day of 8 or less.

21. The composition of claim 1, wherein said composition, upon cure, has a Yellow Index after heating at 150° C. for 4 days of 18 or less.

22. A coated optical fiber comprising a cured composition, wherein said composition comprises, prior to cure:
(a) a polymer having a number average molecular weight of 5,000 or more and containing polymeric units represented by formulas (1) and (2),

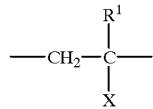

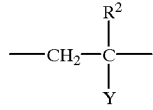

wherein R¹ and R² independently represent a hydrogen atom or a methyl group, X represents a —COOR³ group (wherein R³ is a hydrogen atom or a hydrocarbon group having 1–30 carbon atoms), an aryl group, a cyano group, a halogen atom or alkyl group having 1–10 carbon atoms and Y represents a functional group containing a (meth)acryloyloxy group.

23. The coated fiber of claim 22, wherein said composition further comprises an epoxy resin.

24. The coated fiber of claim 22, wherein said composition further comprises a silane coupling agent.

25. The coated fiber of claim 22, wherein said composition further comprises at least one pigment or dye.

26. The coated fiber of claim 25, wherein said composition is suitable as a secondary coating.

27. The coated fiber of claim 22, wherein said composition has a viscosity of 100 to 20,000 cps at 25° C.

28. The coated fiber of claim 22, wherein said composition has a viscosity of 1,500 to 15,000 cps at 25° C.

29. The coated fiber of claim 22, wherein said composition is suitable as a primary coating.

30. The coated fiber of claim 22, wherein said composition is suitable as a secondary coating.

31. The coated fiber of claim 22, wherein said composition is suitable as a matrix material.

32. The coated fiber of claim 22, wherein said cured composition has a Young's modulus of 0.33 Kg/mm² or less.

33. The coated fiber of claim 22, wherein said cured composition has a Young's modulus of 0.16 Kg/mm² or less.

34. The coated fiber of claim 22, wherein said cured composition has a ΔE value after heating at 150° C. for 1 day of 5 or less.

35. The coated fiber of claim 34, wherein said cured composition has a Yellow Index after heating at 150° C. for 1 day of 8 or less.

36. The coated fiber of claim 22, wherein said cured composition has a ΔE value after heating at 150° C. for 4 days of 12 or less.

37. The coated fiber of claim 36, wherein said cured composition has a Yellow Index after heating at 150° C. for 4 days of 18 or less.

38. The coated fiber of claim 22, wherein said cured composition has a ΔE value after heating at 150° C. for 10 days of 20 or less.

39. The coated fiber of claim 22, wherein said cured composition has a Yellow Index after heating at 150° C. for 1 day of 8 or less.

40. The coated fiber of claim 22, wherein said cured composition has a Yellow Index after heating at 150° C. for 4 days of 18 or less.

41. The coated fiber of claim 22, wherein said composition comprises:
   (a) 1–90% by weight of said polymer;
   (b) 0–80% by weight of a urethane (meth)acrylate oligomer;
   (c) 5–80% by weight of a reaction diluent; and
   (d) 0.1–10% by weight of a photoinitiator.

42. The coated fiber of claim 22, wherein said composition comprises:
   (a) 20–80% by weight of said polymer;
   (b) 10–60% by weight of a urethane (meth)acrylate oligomer;
   (c) 10–60% by weight of a reaction diluent; and
   (d) 0.1–10% by weight of a photoinitiator.

43. An optical fiber ribbon assembly comprising a cured composition, wherein said composition comprises, prior to cure:
   (a) a polymer having a number average molecular weight of 5,000 or more and containing polymeric units represented by formulas (1) and (2),

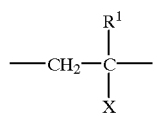

(1)

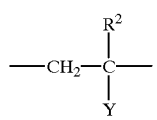

(2)

wherein $R^1$ and $R^2$ independently represent a hydrogen atom or a methyl group, X represents a —$COOR^3$ group (wherein $R^3$ is a hydrogen atom or a hydrocarbon group having 1–30 carbon atoms), an aryl group, a cyano group, a halogen atom or alkyl group having 1–10 carbon atoms and Y represents a functional group containing a (meth)acryloyloxy group.

* * * * *